United States Patent
Alley

[15] 3,668,264
[45] June 6, 1972

[54] PRODUCTION OF ALKYLBENZENES

[72] Inventor: Starling K. Alley, Brea, Calif.

[73] Assignee: Union Oil Company of California, Los Angeles, Calif.

[22] Filed: July 15, 1969

[21] Appl. No.: 842,007

[52] U.S. Cl. ..........................260/671, 208/135, 208/141, 260/668, 260/671 C
[51] Int. Cl. ..........................................................C07c 3/52
[58] Field of Search..................208/135, 141, DIG. 2, 138; 260/668, 668 D, 671, 671 C

[56] References Cited

UNITED STATES PATENTS

| | | | |
|---|---|---|---|
| 3,533,939 | 10/1970 | Coonradt et al. | 208/135 |
| 3,140,253 | 7/1964 | Plank et al. | 208/120 |
| 3,175,967 | 3/1965 | Miale et al. | 208/120 |

Primary Examiner—Curtis R. Davis
Attorney—Milton W. Lee, Richard C. Hartman, Lannas S. Henderson, Dean Sandford and Robert E. Strauss

[57] ABSTRACT

Alkyl benzenes are produced from a cycloalkane, benzene or an alkylbenzene having a lower degree of alkylation by contacting the feedstock with a zeolitic composition of alumina and silica in the absence of any hydrogenating component and at a temperature from about 400° to 700° F. The contacting is performed at a space velocity from about 1 to about 10 liquid volumes per volume per hour and a pressure from about 1 to 100 atmospheres in the absence or presence of hydrogen. It is believed that the contacting under the aforedescribed conditions dehydrogenates the cycloalkanes and fragments some of the aromatic rings. The resulting fragments are active in alkylating remaining aromatic rings to thereby increase the degree of alkylation of the feedstock.

15 Claims, No Drawings

PRODUCTION OF ALKYLBENZENES

DESCRIPTION OF THE INVENTION

The invention relates to a method for synthesizing alkylbenzenes and in particular relates to a method for the synthesis of alkylbenzenes from alkylcycloalkanes, cyclohexane, benzene or alkylbenzenes having a lower degree of alkylation.

The invention comprises contacting a hydrocarbon which can be an alkylcyclopentane, alkylcyclohexane, cyclohexane, benzene or an alkylbenzene having a lower degree of alkyl substitution, e.g., bearing no more than about two alkyl substituents such as toluene or xylene with a zeolitic, molecular sieve catalyst in the absence of any hydrogenating catalytic component and at reaction conditions effective to increase the degree of alkylation of the aromatic content of the feedstock. Such conditions comprise a temperature from about 400° to 700° F., a liquid hourly space velocity from about 1 to about 10 volumes per volume per hour and a pressure from 1 to about 100 atmospheres. The invention can be applied to obtain the alkyl aromatics from cyclohexane or from aromatics having a lower degree of alkyl substitution. The invention can also be employed to selectively decrease the benzene content of gasoline feedstock and increase the alkylbenzene content of the feedstock, thereby improving the burning qualities of the gasoline.

The hydrocarbon reactants used in the synthesis of the alkylbenzene can comprise cyclohexane or alkylcyclopentanes or alkylcyclohexane having one to about three alkyl groups of one to about six carbons, such as methylcyclohexane, methylcyclopentane, ethyl cyclohexane, ethylcyclopentane, dimethylcyclohexane, butyl cyclohexane, diamylcyclopentane, etc.; benzene and lower alkyl benzenes, e.g., the $C_1$–$C_6$ mono- and dialkyl benzenes such as toluene, ethylbenzene, propylbenzene, amylbenzene, xylene, diethylbenzene, dihexylbenzene, propylbenzene, allylbenzene, etc., as well as feedstocks boiling in the gasoline range which are rich in one or more of the aforementioned feedstock components. In particular, gasoline feedstocks having a high content of benzene are especially suitable for use since the treatment of this invention results in conversion of a substantial quantity of their benzene content to alkylbenzenes, thereby improving the cleanliness upon burning of the gasoline feedstock.

The feedstock is contacted with a catalyst comprising a molecular sieve in the absence of any hydrogenating component such as the metals of the Groups VI and VIII. The catalyst thus comprises a partially dehydrated zeolitic composition of silica, alumina and one or more exchangeable cations which can be hydrogen, an alkali metal, an alkaline earth metal or a rare earth metal such as cerium, lanthanum, praseodymium, neodymium, ilinium, samarium, europium, gadolinium, terbium, dysprosium, holmium, erbium, thulium, scandium, yttrium or lutetrium. The compositions are characterized by relatively uniform pore diameters from about 5 to about 15 A and a crystalline structure as reflected by a characteristic X-ray diffraction pattern.

Available forms of the zeolites which are suitable for use herein are the various synthetic A, X, Y or L crystal types, synthetic mordenite or any of the naturally occurring zeolites such as natural mordenite, stilbite, heulandite, ferrierite, dichiardite, chabazite, erionite and faujasite.

The silica to alumina mol ratio in the zeolitic composition ranges generally from about 2.5 to 10, preferably from 3 to about 8, and most preferably from about 4 to 6 as typified by the Y crystal type. The high silica content compositions such as the Y type are particularly suitable when combined with the rare earth cations which can be base exchanged into the crystal lattice.

The synthetic zeolites are initially prepared in the sodium form, i.e., with sodium occupying the ion exchange sites in the crystal lattice. The naturally occurring zeolites are also found in the sodium form. The cations associated with the zeolite can be readily ion exchanged out of the zeolite and replaced with more desirable cations. This technique employs conventional base exchange techniques wherein the zeolite is contacted with an aqueous solution of a salt of the particular cation desired in the crystal. When the hydrogen form of the zeolite is desired, an ammonium salt is used to base exchange ammonium cations for the cations on the zeolite and thereafter the ammonium cations are decomposed by heating of the treated zeolite to a temperature of about 600° to about 1,000° F., sufficient to decompose the ammonium and form hydrogen cations on the ion exchange sites. The treatment of the zeolite can be performed using an aqueous solution of any water soluble salt of the cation desired to be associated with the final catalyst. For efficient base exchange operation, however, it is preferred that the salts having the maximum solubility be used and of these the halides, sulfates and nitrates are a desirable class. Of the halides, it is preferred to use the chlorides, however the fluorides, bromides or iodides are operative. The aqueous solution can thus comprise a solution of a salt of the desired cation, e.g., ammonium chloride, potassium chloride, lithium nitrate, cesium bromide, calcium chloride, barium chloride, strontium chloride, etc. As previously mentioned, however, a preferred group of cations to be associated with the catalyst in amounts sufficient to occupy from 10 to about 95 percent of its ion exchange sites are the rare earth metals and aqueous solutions of the soluble salts of these can be used such as cerous nitrate, lanthanum chloride, praseodymium sulfate, neodymium chloride, ilinium chloride, samarium chloride, europium chloride, gadolinium nitrate, terbium chloride, dysprosium chloride, holmium sulfate, erbium nitrate, thulium chloride, scandium chloride, yttrium chloride and lutetium sulfate.

The aqueous solution employed can comprise a salt of one or more of these aforementioned metals, particularly when the rare earth cations are to be associated with the catalyst since the rare earth salts are more abundant in mixtures than in the purified form. Thus the mixed chlorides of lanthanum, cerium, neodymium and praseodymium can be used in an aqueous solution for the base exchange reaction. Similarly a mixture rich in dysprosium can be used which also contains lanthanum, cerium, praseodymium, neodymium samarium, gadolinium and yttrium.

The base exchange is performed by slowly passing the aqueous solution through a bed of the zeolite and withdrawing an effluent containing the solution of the salt of the displaced congeneric cation, e.g., sodium chloride. After the base exchange has been performed, the catalyst can be washed to displace any of the treating solution from the voids thereof. Thereafter the catalyst can be dried and is suitable for use in the invention.

Prior to its use, the catalyst can also be pretreated by heating to a temperature of about 400° to about 800° F. at atmospheric to about 100 atmospheres pressure in an inert gas or in the presence of hydrogen. Suitable inert gases include argon, hydrogen, carbon dioxide, nitrogen, or mixtures thereof. Preferably this pretreatment is with hydrogen.

The hydrocarbon feedstock is contacted with the zeolite catalyst at a temperature from about 400° to 700° F. The contacting can be performed by any of the various heterogeneous catalysis techniques, e.g., the zeolite can be a finely divided solid, e.g., passing a 20 but retained on a 400 mesh screen, and can be suspended in a vapor stream of the hydrocarbon to be converted. In this system, a fluidized bed technique can be used wherein the suspension takes the form of an ebullient, dense, fluidized bed of the solid particles suspended in upwardly flowing vapors of the reactants and conversion products. Alternatively, the catalyst can be used in granules or particulate form having an average diameter from about 0.5 to about 0.01 inch and can be maintained as a packed bed of particles in a reactor through which the vapors can be passed in upward, downward or radial flow. Preferably the particles have a particle diameter from about one-sixteenth to about three-sixteenths inch and are maintained as a fixed bed in a reactor through which the reactant vapors are passed as an upwardly flowing stream. The temperature control of the reactants can be maintained by heat exchange means maintained in the reactor or the reactor itself can be maintained under approximately adiabatic or isothermal conditions with the necessary temperature control being maintained by the preheating of the reactant stream of the introduction of cooled or preheated recycle gas at periodic points along the reactor.

Regardless of the contacting technique employed, a gaseous effluent is withdrawn from the reaction zone which contains unconverted reactants, the desired alkyl benzenes and minor amounts of low boiling products. The reactants are supplied to the contacting zone at a liquid hourly space velocity of from about 1 to about 10 liquid volumes per volume per hour. The reactants are preheated to the desired reaction temperature and are passed into contact with the catalyst as a vaporized mixture with or without the addition of hydrogen. The hydrogen can be added to prolong the catalyst life by inhibiting or reducing coke formation on the catalyst and the amount of hydrogen which is effective for this purpose comprises an amount from about 500 to about 10,000, preferably from about 1,000 to about 5,000, cubic feet per barrel of liquid reactants.

The gaseous effluent from the reactor can be processed in the conventional manner for separation of the hydrogen, which can be recycled to further contacting, as well as for separation of the unconverted reactants, the desired alkylbenzenes and other byproducts. Such processing comprises cooling of the effluent to condense the higher boiling components thereof and separation under high pressure of the hydrogen which can be withdrawn and returned to further contacting. The liquid condensate separated from the high pressure separate step can be passed to a second separator at a reduced pressure from which the lower boiling hydrocarbon gases can be removed and the remaining condensate can then be fractionated to separate the unconverted reactants from the desired alkylbenzenes. The unconverted reactants will be removed from the top of the fractionating column and the alkylbenzenes will be separated as a sidestream distillate or as the bottoms from the fractionating column.

The products of the reaction are alkylbenzenes such as the toluene, xylene, pseudocumene, durene, ethylbenzene, diethylbenzene, triethylbenzene, propylbenzene, tripolybenzene, amylbenzene, diamylbenzene, amylpropylbenzene, isopropylbenzene, etc.

The invention will now be described by the following illustrated modes of practice of the invention which also serve to demonstrate results obtainable thereby:

EXAMPLE 1

A reactor is charged with a catalyst comprising a Y crystal type zeolite having its base exchange site occupied by rare earth cations and having the following composition:

| Component | Weight Percent |
| --- | --- |
| Rare earth oxides | 10.0 |
| $Na_2O$ | 1.62 |
| $SiO_2$ | 66.3 |
| $Al_2O_3$ | 22.1 |

The catalyst is prepared by treatment under base exchange conditions with an aqueous solution of the halides of the rare earth elements comprising lanthanum, praseodymium, neodymium, and trace amounts of samarium, and gadolinium chlorides. The resultant base exchange hydrogel is then washed free of soluble anions, dried in air at approximately 300° F., tempered in air for 16 hours at about 900° F. and thereafter pretreated by heating for 1 hour at 800° F. in argon. The catalyst is in the form of particles having an average diameter of about one-eighth inch.

The reactor is pressured to 200 psig with hydrogen and heated to a temperature of 700° F., then cooled to 400° F. Cyclohexane is then heated to 400° F. and passed into the reactor at about 200 psig at a liquid hourly space velocity of approximately 1 volume per volume per hour. The products are cooled, condensed and analyzed. The experiment is then repeated at 500°, 600° and 700° F. The liquid condensate from the 700° F. experiment yields about 61 percent methylcyclopentane and approximately 16 percent yield alkylbenzenes. The alkylbenzenes are analyzed to reveal the following product distribution:

| Toluene | 29 percent |
| --- | --- |
| Ethylbenzene | 2.9 |
| Para-xylene | 8.8 |
| Meta-xylene | 19.6 |
| Methylxylene | 8.5 |
| 1-methyl-4-ethylbenzene | 1.0 |
| 1,3,5-trimethylbenzene | 3.7 |
| 1,2,4-trimethylbenzene | 9.5 |
| Dimethylcyclopentane | 13.8 |

The analysis of the liquid condensates of the effluents from the experiments reveals substantially the same product distribution at all temperatures and increased conversion rates with the increased temperatures.

The reaction with cyclohexane is repeated, however the catalyst is changed to a Y crystal type zeolite having its base exchange sites occupied with calcium to provide a concentration of about 6 weight percent calcium oxide. The yield of products is substantially the same as in the preceding example; however, the conversion rate is approximately one-fifth that observed for the rare earth containing catalyst.

EXAMPLE 2

The reaction is repeated, however benzene is substituted for the cyclohexane feedstock. The liquid condensate from the effluent of the 700° F. experiment has the following composition:

| Benzene | 76 percent |
| --- | --- |
| Toluene | 15 |
| Ethylbenzene | 7 |
| Misc. heavier hydrocarbons | 2 |

EXAMPLE 3

The following example illustrates that the presence of a hydrogenation component on the catalyst substantially inhibits the formation of the alkylbenzene products. In this example, the catalyst comprises a rare earth Y crystal type zeolite containing platinum. The catalyst is prepared by impregnation of a rare earth Y crystal type zeolite with a solution of chloroplatinic acid to obtain a catalyst containing 0.55 percent platinum. The catalyst is dried at 230° F. and calcined for 16 hours at 800° F. The catalyst is charged to the reactor and reduced by passing a stream of hydrogen through the reactor at 1,000° F. for 2 hours. The catalyst is then cooled to 400° F. in the presence of hydrogen.

The catalyst is employed for conversion of cyclohexane in the same procedure as set forth in the preceding examples. Analysis of the liquid condensates from the effluents of each of the runs reveals that no significant amounts of aromatics are present. Analysis of the gas fractions of the effluents reveals a significantly higher yield of $C_1$ to $C_4$ gases than observed in the preceding examples. This example thus illustrates that the presence of a hydrogenation component on the catalyst deactivates the catalyst for aromatic and alkyl aromatic production.

Although the examples have illustrated the preferred mode of practice with employment of a Y crystal type zeolite and conversion of benzene or cyclohexane, other crystal type zeolites and/or hydrocarbons such as disclosed herein can be substituted for those employed in the examples without change in the illustrated mode of practice to yield alkylated benzenes as a product of the reaction.

I claim:

1. The synthesis of $C_1$ to $C_4$ alkyl benzenes product from a hydrocarbon feedstock selected from the class consisting of benzene, cyclohexane and alkyl cyclopentane and alkyl cyclohexane having from one to two alkyl groups of from one to six carbon atoms and having a lower degree of ring alkylation than said product, which comprises contacting said hydrocarbon with a catalyst comprising a zeolitic composition of alumina and silica having a relatively uniform pore diameter from about 5 to 15 A, in the absence of any hydrogenating catalytic component, and at reaction conditions effective to form said alkyl benzenes having a higher degree of ring alkylation than said feedstock, comprising a temperature from about 400° to 700° F., a liquid hourly space velocity from 1 to about 10 volumes per volume per hour and a pressure from 1 to about 100 atmospheres.

2. The synthesis of claim 1 wherein said catalyst comprises a zeolite having from 10 to about 95 percent of its ion exchange sites occupied by a rare earth cation.

3. The synthesis of claim 1 wherein said catalyst is a zeolite having a mol ratio of silica to alumina from 3 to about 8.

4. The synthesis of claim 3 wherein said catalyst is a zeolite having a Y crystal type.

5. The synthesis of claim 4 wherein said zeolite has from 10 to about 95 percent of its ion exchange sites occupied by a rare earth cation.

6. The method of claim 1 wherein said catalyst is pretreated prior to said contacting with said hydrocarbon by maintaining said catalyst at a temperature of 600°–1,000° F. for a period of from one-half to 10 hours while in contact with hydrogen or an inert gas.

7. The method for increasing the content of alkylbenzenes and decreasing the content of benzene in a hydrocarbon stream without substantially decreasing its boiling point which comprises contacting said stream with a catalyst comprising a zeolitic, metallo aluminosilicate having a relatively uniform pore diameter from about 5 to 15 A, in the absence of any hydrogenating catalytic component, and at reaction conditions effective to convert said benzene to alkylbenzenes including a temperature from about 400° to 700° F., a liquid hourly space velocity from 1 to about 10 volumes per volume per hour and a pressure from 1 to about 100 atmospheres.

8. The method for increasing the degree of alkylation of an aromatic hydrocarbon without substantially decreasing its boiling point which comprises contacting said hydrocarbon with a catalyst comprising a zeolitic, metallo aluminosilicate having a relatively uniform pore diameter from about 5 to 15 A, in the absence of any hydrogenating catalytic component, and at reaction conditions effective to crack the nucleus of some of the aromatics into alkyl fragments and alkylate remaining aromatics with said fragments comprising a temperature from about 400° to 700° F., a liquid hourly space velocity from 1 to about 10 volumes per volume per hour and a pressure from 1 to about 100 atmospheres.

9. The method of claim 7 wherein said catalyst is a zeolite having a mol ratio of silica to alumina from 3 to about 8.

10. The method of claim 9 wherein said catalyst is a zeolite having a Y crystal type.

11. The method of claim 10 wherein said zeolite has from 10 to about 95 percent of its ion exchange sites occupied by a rare earth cation.

12. The method of claim 8 wherein said catalyst is a zeolite having a mol ratio of silica to alumina from 3 to about 8.

13. The method of claim 12 wherein said catalyst is a zeolite having a Y crystal type.

14. The method of claim 13 wherein said zeolite has from 10 to about 95 percent of its ion exchange sites occupied by a rare earth cation.

15. The method of claim 8 wherein said catalyst is pretreated prior to said contacting with said hydrocarbon by maintaining said catalyst at a temperature of 600° to 1,000° F. for a period of from one-half to 10 hours while in contact with hydrogen or an inert gas.

* * * * *